Nov. 10, 1964 O. B. STRAM ETAL 3,156,905

MAGNETIC STORAGE ARRANGEMENT

Filed Dec. 30, 1960 4 Sheets-Sheet 1

INVENTORS.
OSCAR B. STRAM
EDWARD V. TROCKY
BY James J. Wood
ATTORNEY

| $X_3$ | $X_2$ | $X_1$ | $X_0$ | $f_1$ |
|---|---|---|---|---|
| 0 | 0 | 0 | 1 | 1 |
| 0 | 0 | 1 | 1 | 1 |
| 0 | 1 | 0 | 1 | 0 |
| 0 | 1 | 1 | 1 | 0 |
| 1 | 0 | 0 | 1 | 1 |
| 1 | 0 | 1 | 1 | 0 |
| 1 | 1 | 0 | 1 | 0 |
| 1 | 1 | 1 | 1 | 0 |

INVENTORS.
OSCAR B. STRAM
EDWARD V. TROCKY
BY James J. Wood
ATTORNEY

INVENTORS.
OSCAR B. STRAM
EDWARD V. TROCKY
BY James J. Wood
ATTORNEY

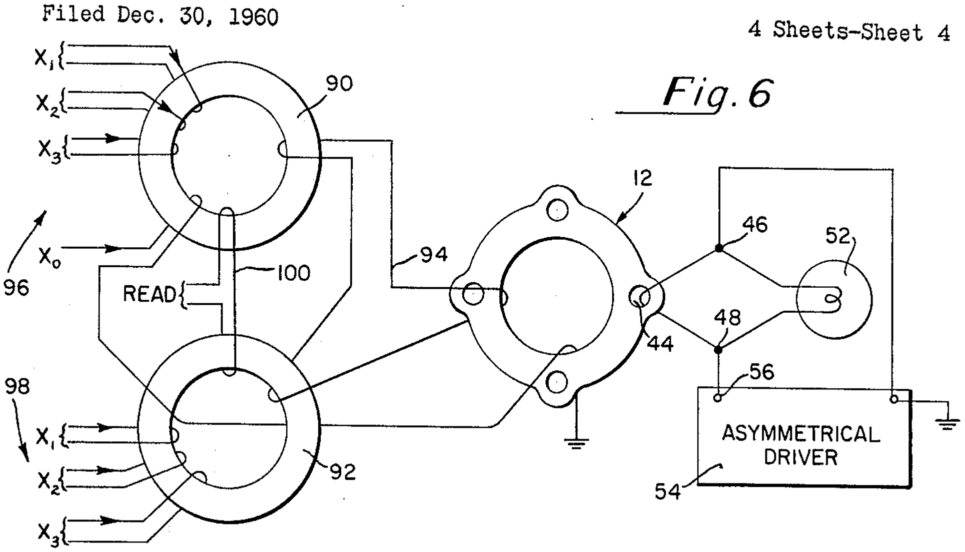
Fig. 6
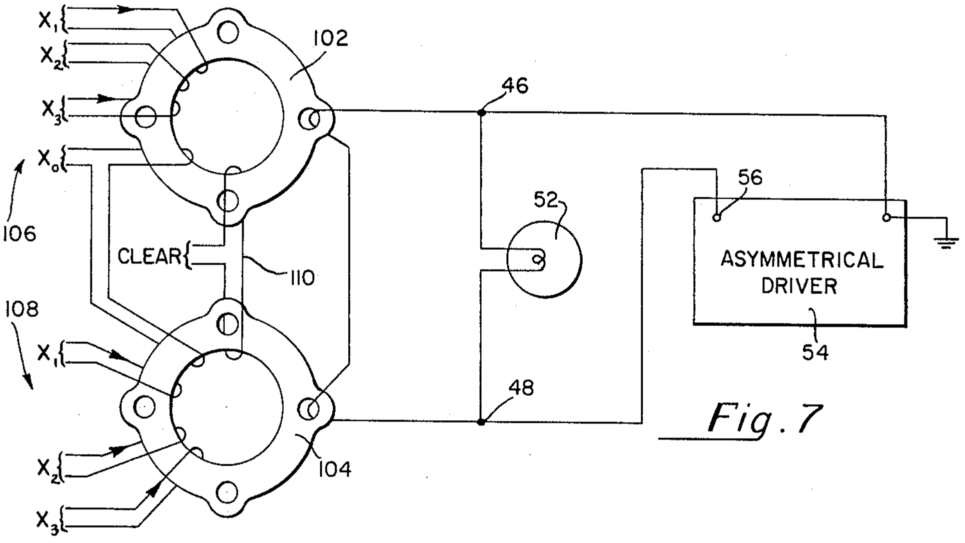
Fig. 7
| $X_3$ | $X_2$ | $X_1$ | $X_0$ | $f_2$ | F | G |
|---|---|---|---|---|---|---|
| 0 | 0 | 0 | 1 | 1 | 1 | 0 |
| 0 | 0 | 1 | 1 | 0 | 0 | 0 |
| 0 | 1 | 0 | 1 | 0 | 0 | 0 |
| 0 | 1 | 1 | 1 | 1 | 0 | 1 |
| 1 | 0 | 0 | 1 | 1 | 1 | 0 |
| 1 | 0 | 1 | 1 | 1 | 1 | 0 |
| 1 | 1 | 0 | 1 | 1 | 1 | 0 |
| 1 | 1 | 1 | 1 | 0 | 0 | 0 |
$F = X_0 - X_1 - X_2 + X_3$
$G = -X_0 + X_1 + X_2 + X_3$
Fig. 5
INVENTORS.
OSCAR B. STRAM
EDWARD V. TROCKY
BY James J. Wood
ATTORNEY United States Patent Office 3,156,905

Patented Nov. 10, 1964

3,156,905
MAGNETIC STORAGE ARRANGEMENT

Oscar B. Stram, Paoli, and Edward V. Trocky, Philadelphia, Pa., assignors to Burroughs Corporation, Detroit, Mich., a corporation of Michigan Filed Dec. 30, 1960, Ser. No. 79,762
18 Claims. (Cl. 340—174)

This invention relates to a magnetic storage arrangement, and more specifically to an arrangement for storing information in response to logic operations in conjunction with the non-destructive read out of magnetic storage means which allows a continuing read out operation.

In the digital computer art it is frequently necessary to visibly indicate the remanent state of a magnetic storage element usually for the purpose of monitoring the overall system. In the prior art the overall problem is complicated by the fact that in the reading of magnetic cores, the read out signal has a time duration in the order of microseconds so that any utilization of this transient signal of necessity requires additional hardware. With the ever increasing complexity of present day computer equipment both civilian and military it is mandatory that every effort be made to reduce the number of required components and to provide a device for permitting a repetitive read out.

In accordance with one preferred embodiment of this invention there is provided an improved magnetic storage arrangement which comprises a magnetic element which is capable of assuming stable states of magnetic remanance, which element has a large aperture and at least one small aperture. A plurality of windings are threaded through the large aperture and wound around the magnetic element. These latter windings are adapted to receive a logic input composite signal. First means are coupled to the magnetic element and adapted to receive an asymmetrical electrical signal. Second means, having a portion thereof threaded through said small aperture, are adapted to detect changes in the flux in said magnetic element.

In accordance with another preferred embodiment there is provided an improved magnetic storage arrangement comprising a first magnetic circuit of a material which is capable of assuming stable states of magnetic remanence. A plurality of windings are coupled to said first magnetic circuit and adapted respectively to receive signals to provide a logic input composite signal to place said material in one of said stable states. A second magnetic circuit of a material which is capable of assuming stable states of magnetic remanence is coupled to said first magnetic circuit by a transfer loop. First means coupled to said second magnetic circuit are adapted to receive an asymmetrical signal. A clear winding, adapted to receive a clear signal to place said second circuit material in a reference remanent condition, is coupled to the second magnetic circuit. Second means are coupled to the second magnetic circuit and adapted to detect changes in the flux of said first magnetic circuit material.

Accordingly, it is an object of this invention to provide an improved magnetic storage arrangement which will require a minimum of components in order to perform a given logical operation.

Another object of the invention is to provide an improved magnetic storage arrangement in which the remanent state of a magnetic storage element may be continuously indicated.

The novel features which are believed to be characteristic of this invention are set forth with particularity in the appended claims. The invention itself however, both as to its organization and method of operation, together with further objects and advantages thereof, may best be understood by reference to the following description, taken in connection with the accompanying drawings in which:

FIG. 5 is a truth table utilized in the description of FIGS. 6 and 7;

FIG. 6 is an electrical schematic in accordance with an illustrative embodiment of the invention; and FIG. 7 is an electrical schematic in accordance with an illustrative embodiment of the invention.

Figure 1:
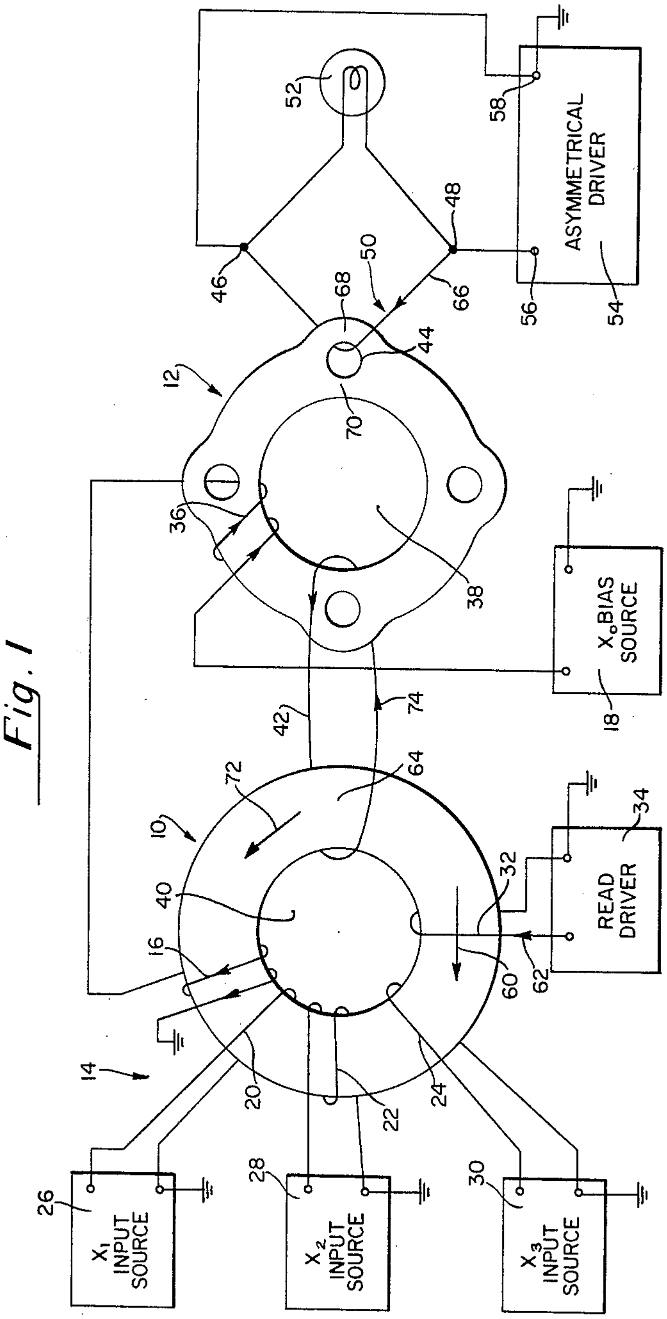
FIG. 1 is an electrical schematic showing the circuit arrangement in accordance with one illustrated embodiment of the invention.
Figures 2, 3:
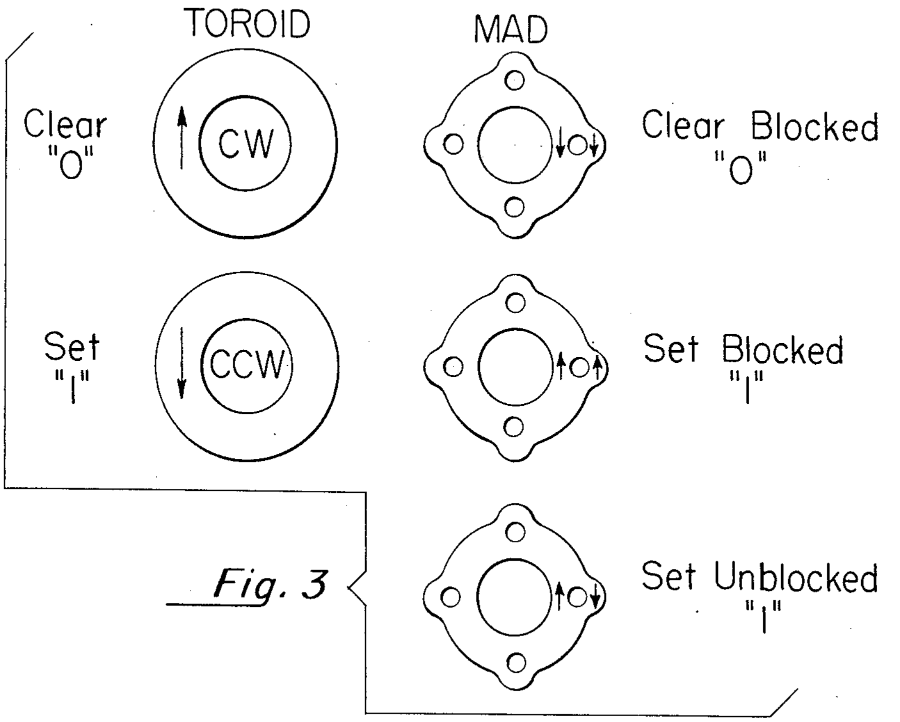
FIG. 2 is a truth table for an arbitrary three variable logic switching function utilized in explaining the operation of embodiments of FIGS. 1 and 4.
FIG. 3 is a schematic defining the various remanent magnetic conditions of the magnetic storage elements.

In FIG. 1 there is shown a magnetic storage arrangement for performing a logical operation, the truth table for which is shown at FIG. 2.

Before beginning a description of the embodiment of FIG. 1, it will be helpful to briefly consider the truth table or table of combinations shown in FIG. 2. The logical operation here depicted is that of a three variable (X1, X2, X3) arbitrary switching function. The X0 is a pluse bias input, having the binary value of "1"; it is used here solely to enable complementary drivers to be eliminated. The column identified as $f1$ represents the binary value of the particular input combination of X0, X1, X2, X3 indicated in the related row. By definition, a "1" is true and a "0" is false. In one application the windings X0, X1, X2 and X3 had the following number of turns:

X0=2 turns (on toroid 10)
X1=−1 turn
X2=−2 turns
X3=−1 turn where the + and − convention indicates opposite winding directions.

Referring now to FIG. 1 there is shown a toroid indicated generally at 10, and a multi-apertured device (referred to in abbreviated form as MAD) indicated generally at 12. The magnetic core 10 may consist of either a ceramic ferrite material or of ultra-thin ferromagnetic alloy tape wound on a non-ferromagnetic spool, the distinguishing feature being that the core exhibits a nearly or substantially rectangular hysteresis loop. The MAD may consist of molded ceramic "ferrite" material which also has a nearly rectangular hysteresis loop, and consequently, a remanent induction $Br$ substantially equal to the saturated induction $Bs$.

The particular configuraton of MAD here uitilized is of the type having four small apertures, and a larger centrally located aperture. In this illustrated embodiment, only the large aperture and one small aperture are utilized.

The toroid 10 is provided with an input composite indicated generally at 14. In the illustrative embodiment of FIG. 1 the input composite comprises: bias winding 16 connected to X0 bias source 18 and a plurality of input windings indicated at 20, 22, 24 connected to sources 26(X1), 28(X2) and 30(X3) respectively and are arranged to perform the arbitrary logic functional operations referred to in connection with the discussion of the truth table of FIG. 2. A read-out winding 32 is connected to a read driver indicated in box form at 34. For convenience bias source 18 is also connected to winding 36 which is wound through the aperture 38 of the MAD 12; this winding 36 serves to clear the MAD as will be explained presently.

The aperture 40 of the toroid 10 is coupled to the large aperture 38 of the MAD 12 by means of a transfer loop 42. One small aperture of the MAD 12 is identified with the numeral 44. The small aperture 44 is connected to terminals 46 and 48 by means of a coupling indicated generally at 50.

In the illustrated embodiment of FIG. 1 an incandescent lamp 52 is connected to terminals 46 and 48; however, any other convenient light source may be used such as for example, a gas discharge lamp or electro-illuminescent cell. An asymmetrical driver indicated in box form at 54, is also connected to terminals 46, 48; terminal 56 of the asymmetrical driver 54 is connected to terminal 48, while terminal 58 is connected to terminal 46 and to ground as shown.

For convenience the arbitrarily defined flux directions in the toroid and MAD (multi-aperture-device) are indicated in FIG. 3. As will be noted from the study of the toroid in FIG. 3, the CLEAR or binary "0" is the clockwise direction and the SET or binary "1" is the counterclockwise direction. Similarly, in the MAD device the "CLEAR BLOCKED" (binary "0"), "SET BLOCKED" (binary "1"), and "SET UNBLOCKED" (binary "1") conditions are illustrated by the small arrows indicating the flux direction in the legs in either side of the small aperture 44 of the MAD.

The purpose of the incandescent lamp 52 is to enable one to determine continuously the remanent magnetic state of the toroid 10. This will be arbitrarily defined by the state of illumination of the incandescent lamp 52; that is, when the lamp is energized the toroid 10 prior to being read by driver 34 is in the "1" state and conversely, when it is not energized the toroid 10 prior to being read by driver 34 is in the "0" state.

The asymmetrical driver 54 is a current generator in which the positive and negative portions of the waveform are unequal. In the illustrated embodiment the positive current time product is greater than the negative current time product.

*Operation of the FIG. 1 Embodiment*

In the operation of the embodiment of FIG. 1, various input signals are applied to windings 20, 22, 24 . . . *n*. The toroid 10 responds to the resultant magnetomotive force applied thereto, and the core assumes either one of the two possible remanent magnetic states, i.e., clockwise or counterclockwise. The resultant remanent magnetic condition is indicated in the column captioned "$f_1$" for the various input combinations.

As a hypothetical case we shall assume the following inputs:

X1=0
X2=1
X3=0
where X0=1

Thus the core remains in the CLEAR or "0" direction, i.e., clockwise. This condition is indicated symbolically by the arrow 60 on the toroid for the CLEAR condition.

We shall first consider the case of the toroid 10 in the CLEAR "0" state.

*The Toroid 10 in the CLEAR or Zero State*

The toroid 10 is in the clockwise state as indicated by the arrow 60. The X0 bias source 18, since it applied a current pulse to the toroid 10 for every state of the truth table, may conveniently be applied to the MAD 12 to drive this magnetic storage element in the clockwise direction; this latter condition is denominated the CLEAR BLOCKED status as defined in FIG. 3. When it is desired to read the toroid 10, a pulse signal is applied from source 34 in the direction shown by the arrow 62. In this direction, the toroid 10 is driven in the direction of saturation, so that upon termination of the signal little or no change in flux takes place; there is thus little or no change in the flux in the region 64 of toroid 10 where the transfer loop 42 is coupled to the toroid 10, and consequently, the loop 42 does not develop a counter electromotive force.

On the positive half cycle of the asymmetrical drive input (indicated by arrow 66), the flux set up in the MAD 12 is such as to drive the leg 68 further into saturation and little or no change in flux takes place. Accordingly, the light source 52 is shorted out.

On the negative half cycle there is a tendency to change the flux in the leg 68. However, because of the relatively weak magnitude of the negative half cycle it is insufficient to switch the flux around the large aperture 38. Thus the MAD remains in the CLEAR BLOCKED condition and the light source 52 remains unenergized.

We shall now consider the SET or "1" state of the toroid 10. Assume the following inputs:

X1=0
X2=0
X3=1
where X0=1

This is sufficient to drive the toroid 10 to the counterclockwise state as indicated by the arrow 72.

*Toroid 10 in the SET or One State*

When the read out signal is applied from the READ DRIVER 34, flux is set up in the clockwise direction. This change in flux in the region 64 causes a counter electromotive force to be set up in the transfer winding 42 in order to oppose this change; the direction of the resulting current in the transfer loop 42 is indicated by the arrow 74.

The current in the transfer loop 42 causes flux to flow in the counterclockwise direction in the MAD 12, and the resulting flux pattern is denominated the SET BLOCKED condition (FIG. 3).

The positive half cycle of the asymmetrical signal has sufficient magnitude so that on the first cycle the flux in the core 12 is switched in a path which includes leg 68 and around the large aperture 38. This unblocks the MAD 12 and the flux in leg 68 is reversed so that the SET UNBLOCKED state is obtained (see FIG. 3).

Once the core is in the SET UNBLOCKED condition the negative half cycle of the asymmetrical signal is sufficient to switch the flux in the legs 68 and 70 so that an alternating current signal is applied to the incandescent lamp 52.

The embodiment of FIG. 1 requires two cores: the toroid 10 and the MAD 12. With the arrangement shown in FIG. 4 it is possible to utilize a single MAD to perform both the logic function as well as the function of switching magnetic flux for the purpose of energizing a device such as the incandescent lamp 52.

Figure 4:
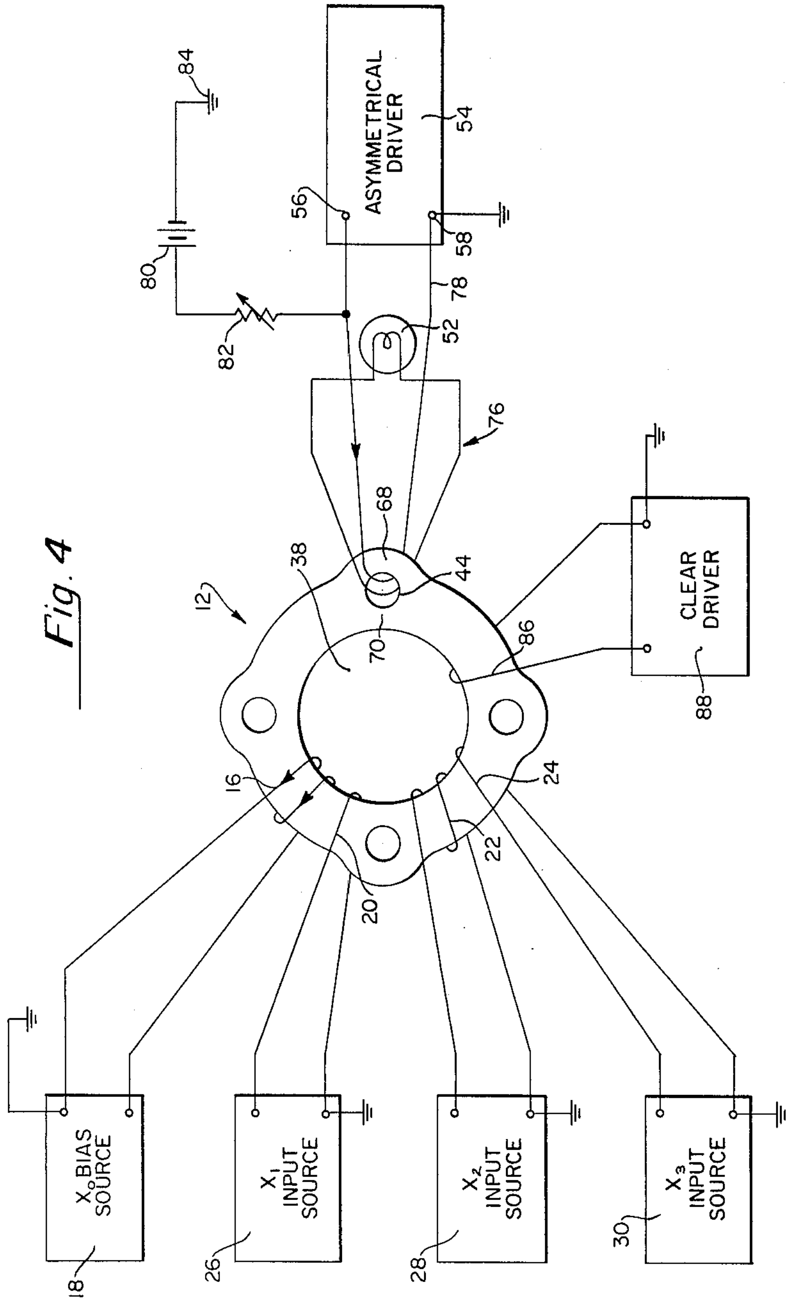
FIG. 4 is an electrical schematic showing the circuit arrangement in accordance with an illustrative embodiment of the invention.

In the embodiment of FIG. 4, the windings X0, X1, X2, X3, identified as in the FIG. 1 embodiment as 16, 20, 22, 24, are wound through the center aperture 38 to provide the same logic switching as identified in the truth table shown in FIG. 3. An incandescent lamp 52 is coupled to aperture 44 by means of coupling 76. The terminals 56, 58 of the asymmetrical driver 54 are connected to a coupling 78 which is looped through the aperture 44.

The D.-C. level of the asymmetrical driver 54 is made variable by means of a battery 80 and a variable resistor 82 connected between terminal 56 and ground 84 as shown.

A clear winding 86 is threaded through the large aperture 38 and wound around the MAD 12 as shown; the winding 86 is energized from its source 88.

*Operation of FIGURE 4*

The operation of the arrangement shown in FIG. 4 is similar to that of the FIG. 1 embodiment. With the MAD 12 in the CLEAR or ZERO state the positive half cycle of the asymmetrical signal will drive leg 68 further into saturation and hence there will be no change in flux. On the negative half cycle of the asymmetrical signal there is a tendency to switch the flux in leg 68 and to drive the leg 70 further into saturation, however, no change in flux takes place because the negative half cycle is insufficient in magnitude to switch the flux around the large aperture 38.

When the MAD 12 is placed in the ONE state by the input composite 14, the light source 52 is energized. The positive half cycle of the asymmetrical signal drives the flux in a path which includes leg 68 and around the large aperture 38. The flux is then in the SET UNBLOCKED condition. The negative half cycle of the asymmetrical signal then causes flux switching around the small aperture 44. The incandescent lamp 52 will continue to be energized so long as the MAD 12 is in the ONE state.

The purpose of the clear driver 88 is to drive the MAD 12 to a reference remanent state prior to the application of the input composite signal. If desired the input composite may be changed so that in order to produce a ZERO in the MAD 12, the magnetomotive force is made 1 units instead of zero units, so that the MAD 12 is always self-clearing for the ZERO state.

In some applications it may not be possible to realize a function with the utilization of a single magnetic storage element. For example, referring now to the truth table shown in FIG. 5, the function $f_2$ is not realizable with a single magnetic storage element. Accordingly, magnetic storage elements F and G are provided. These latter functions are expressed mathematically as follows:

$$F=X0-X1-X2+X3$$
$$G=X0+X1+X2-X3$$

Physically the function $f_2$ may be realized with the arrangement shown in FIG. 6 or FIG. 7.

In the embodiment of FIG. 6, the F function is performed by the toroid 90 and the G function is performed by the toroid 92. The toroids 90 and 92 are coupled to MAD 12 by means of a transfer loop 94. The input composite for the toroids 90 and 92 are indicated generally at 96 and 98 respectively. The input composite 96 comprises input X0, X1, X2, X3 each having windings of a single turn identified as to windings directed as follows:

X0=+1 turn
X1=−1 turn
X2=−1 turn
X3=+1 turn

The input composite 98 comprises inputs X0, X1, X2, X3 each having windings of a single turn identified as to winding directions as follows:

X0=−1 turn
X1=+1 turn
X2=+1 *turn*
X3=−1 turn

A read winding 100 for both toroids 90 and 92 is wound in the direction shown.

In the interest of simplicity, sources for the input composites 96, 98 and the read drive for read winding 100 have not been indicated on the figure, although it will be understood that they are similar to that shown and described in FIGS. 1 and 4.

In the embodiment of FIG. 7 the F function is performed by the MAD 102 and the G function is performed by the MAD 104. The input composite for the MADs 102 and 104 are indicated generally 106 and 108 respectively. The input composite 106 comprises inputs X0, X1, X2, X3 each having a single turn identified as to winding directions as follows:

X0=+1 turn
X1=−1 turn
X2=−1 turn
X3=+1 turn

The input composite 108 comprises inputs X0, X1, X2, X3 each having windings of a single turn identified as to winding directions as follows:

X0=−1 turn
X1=+1 turn
X2=+1 turn
X3=−1 turn

The clear winding for both MAD 102 and 104 is indicated at 110.

Again in the interest of simplicity the sources for the input composites 106, 108 and the clear winding have not been indicated.

The operation of the embodiments of FIGS. 6 and 7 is the same as that of FIGS. 1 and 4 and thus it is not necessary to describe it in detail.

Obviously many modifications and variations of the present invention are possible in the light of the above teachings. It is therefore to be understood that within the scope of the appended claims the invention may be practiced other than as specifically described and illustrated.

What is claimed is:

1. A magnetic storage arrangement comprising, a magnetic element capable of assuming stable states of magnetic remanence and having a large aperture and at least one small aperture, a plurality of windings threaded through said large aperture and wound around said magnetic element being adapted to receive a logic input signal composite to place said magnetic element in one of said stable states, first means coupled to said magnetic element an asymmetrical signal source connected to said first means having a signal of predetermined positive and negative magnitudes sufficient to permit reversal of the flux direction in the region of said small aperture when said magnetic element is in a predetermined stable state, and second means coupled to said magnetic element having a winding portion thereof threaded through said small aperture, adapted to detect changes in flux in the region of said small aperture.

2. A magnetic storage arrangement according to claim 1 including a clear winding wound through said large aperture and about said magnetic element and adapted to receive a clear signal for driving the said magnetic element to a reference remanent state.

3. A magnetic storage arrangement according to claim 1 in which said circuit means comprises a visual indicating device connected thereto.

4. A magnetic storage arrangement comprising at least one magnetic element capable of assuming stable states of magnetic remanence and having a large aperture, and at least one small aperture, winding means threaded through said large aperture to receive a logic input signal composite to place said magnetic element in one of said stable states, and to cause the magnetic material on both sides of said small aperture to acquire a common flux direction, circuit means coupled to said magnetic element, and asymmetrical signal source connected to said circuit means having a signal amplitude of magnitudes in the positive and negative directions sufficient to permit reversal of flux direction in the region of said small aperture when said magnetic element is in a predetermined stable state, said circuit means including a winding portion thereof threaded through said small aperture, adapted to detect said flux reversals in the region of said small aperture.

5. A magnetic storage arrangement according to claim 4 including a clear winding wound through said large aperture and about said magnetic element and adapted to receive a clear signal for driving the said magnetic element to a reference remanent state.

6. A magnetic storage arrangement according to claim 4 in which said circuit means comprises visual indicating means connected thereto.

7. A magnetic storage arrangement as defined in claim 4 wherein said arrangement includes a second magnetic element capable of assuming stable states of magnetic remanence and having a large aperture and at least one small aperture, said winding means being threaded through the large aperture of both said magnetic elements for placing said magnetic elements in predetermined ones of said stable states, said circuit means being coupled to both said magnetic elements and including a winding portion threaded through the small aperture of each of said magnetic elements to detect the flux reversals in the region of said small apertures.

8. A magnetic storage arrangement as defined in claim 4 wherein said arangement includes a second magnetic element capable of assuming stable states of magnetic remanence, a transfer loop coupling said second magnetic element and said at least one magnetic element, a plurality of windings coupled to said second magnetic element for receiving said logic input signal composite, and means causing the stable storage state of said second magnetic element to be interrogated and thereby provide a signal through said transfer loop to the said winding means of said at least one magnetic element.

9. A magnetic storage arrangement as recited in claim 4 wherein said at least one magnetic element includes a first magnetic circuit having a plurality of magnetic elements, a plurality of windings coupled to each magnetic element for receiving a logic input signal composite, a second magnetic circuit comprising an additional magnetic element, a transfer loop coupling the magnetic elements of said plurality of elements and said additional magnetic element in series array and wherein said circuit means connected to an asymmetrical signal source is coupled to said additional magnetic element.

10. A magnetic storage arrangement according to claim 7 including a clear winding wound through said large aperture and about each of said magnetic elements for driving said magnetic elements to a reference remanent state.

11. A magnetic storage arrangement according to claim 7 in which said circuit means comprises a visual indicating device connected, thereto an incandescent lamp.

12. A magnetic storage arrangement according to claim 8 in which the material of said second magnetic circuit is arranged in the geometrical configuration of a toroid and has a substantially rectangular hysteresis loop.

13. A magnetic circuit arrangement according to claim 8 in which said circuit means comprises a visual indicating device.

14. A magnetic storage arrangement according to claim 9 in which said plurality of magnetic elements are each in the configuration of a toroid.

15. A magnetic storage arrangement according to claim 9 in which said additional magnetic element is in the geometrical configuration of a multi-apertured device having one large aperture and at least one small aperture, said circuit means being coupled to said second magnetic circuit through said small aperture.

16. A magnetic storage arrangement according to claim 9 comprising a read winding coupled to said plurality of magnetic elements and adapted to receive a read signal.

17. A magnetic storage arrangement according to claim 9 in which said circuit means comprises a visual indicating device.

18. An indicator circuit comprising a magnetic core having two stable states of magnetic remanence, said core having a major aperture and a minor aperture, input signal winding means threaded through said major aperture and coupled to said core adapted to provide a signal input composite to establish said core in one or the other of said stable states thereby setting the core material on both sides of said minor aperture in a first or a second common flux direction, interrogating winding means threaded through said minor aperture and having connected thereto a visual indicator and an asymmetrical current driver, the peak magnitude of current provided by said current driver flowing through said minor aperture being active to switch the flux direction in the region of said minor aperture only when said core is in one of its two stable states, thereby providing energy to said visual indicator.

References Cited in the file of this patent

UNITED STATES PATENTS

| | | |
|---|---|---|
| 2,968,030 | Crane | Jan. 10, 1961 |
| 2,969,523 | Kelley | Jan. 24, 1961 |
| 2,978,176 | Lockhart | Apr. 4, 1961 |

UNITED STATES PATENT OFFICE

CERTIFICATE OF CORRECTION

Patent No. 3,156,905 November 10, 1964

Oscar B. Stram et al.

It is hereby certified that error appears in the above numbered patent requiring correction and that the said Letters Patent should read as corrected below.

Column 3, line 25, for "in", second occurrence, read -- on --; column 7, line 41, after "connected" strike out the comma.

Signed and sealed this 30th day of March 1965.

(SEAL)
Attest:

ERNEST W. SWIDER
Attesting Officer

EDWARD J. BRENNER
Commissioner of Patents